Patented June 25, 1929.

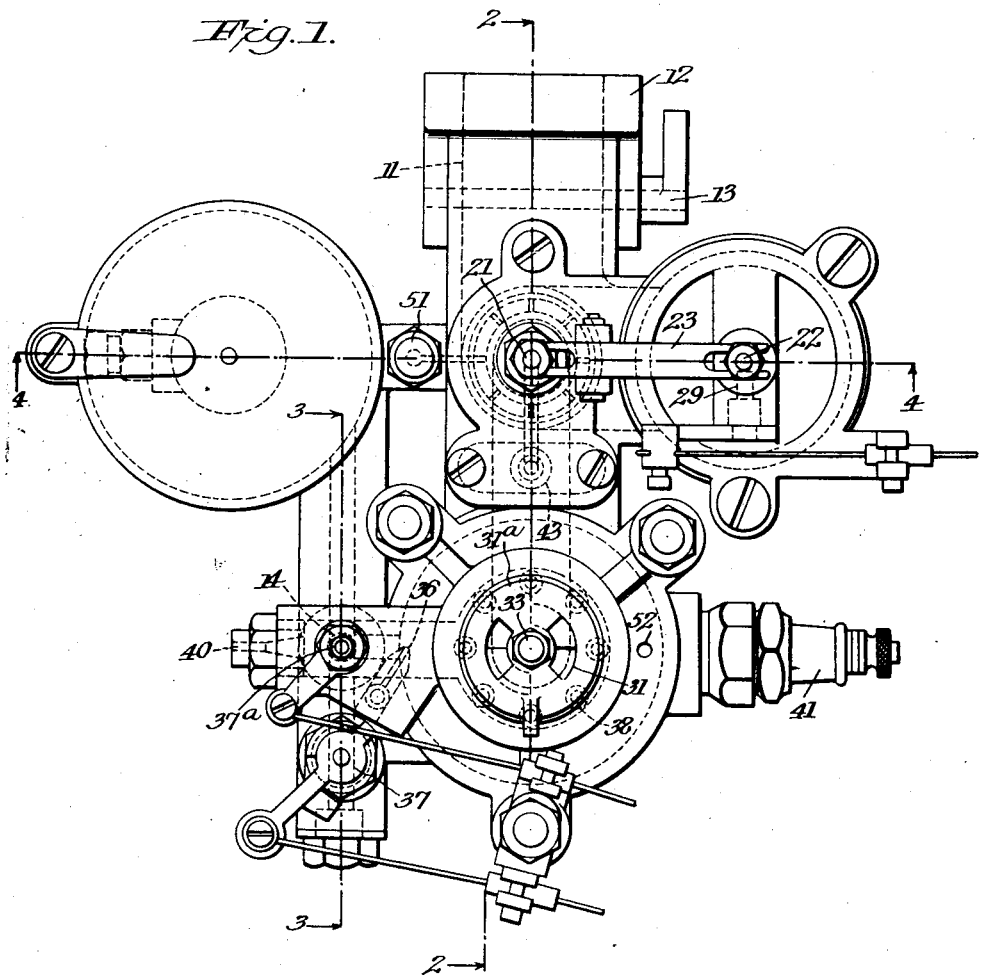

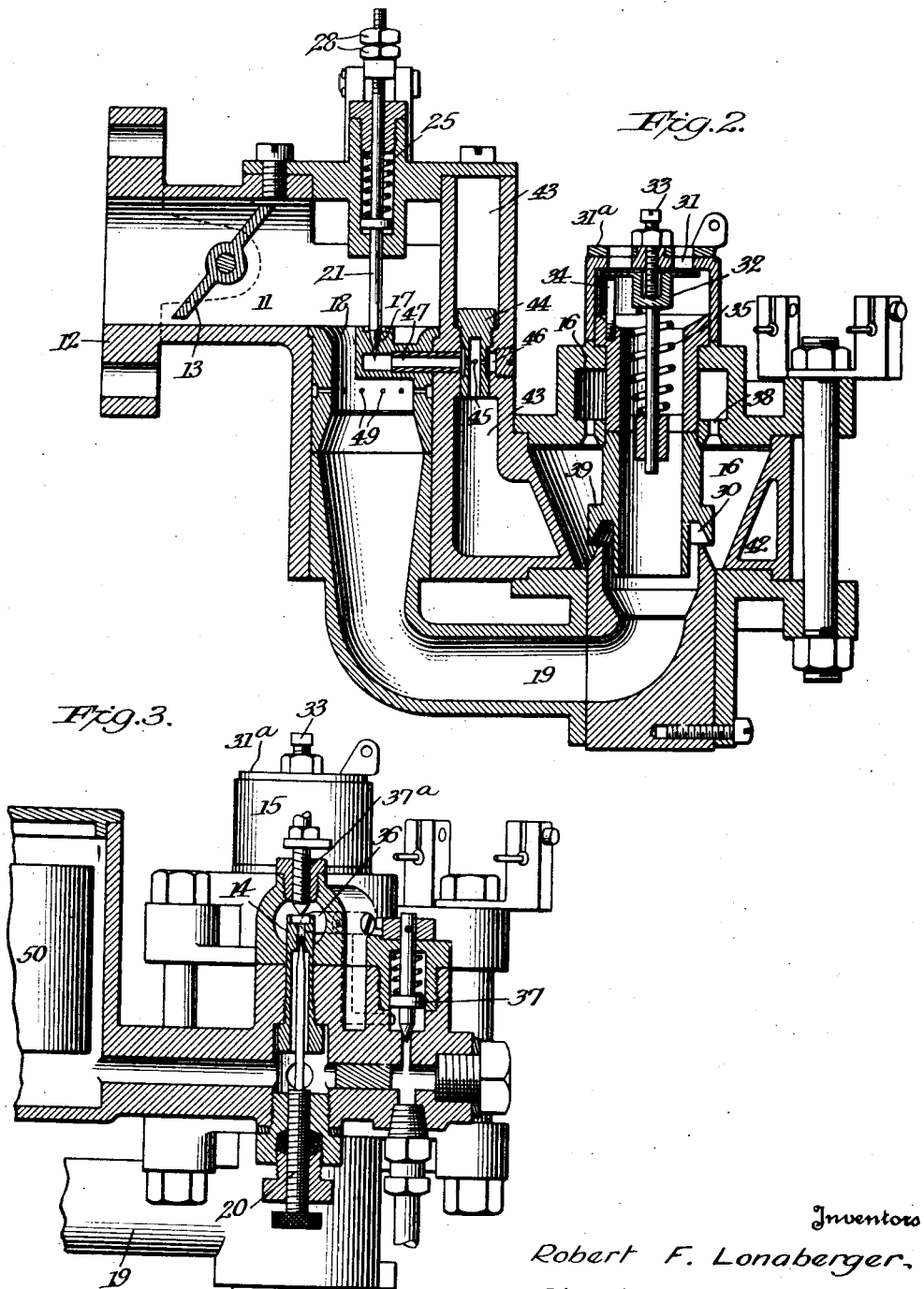

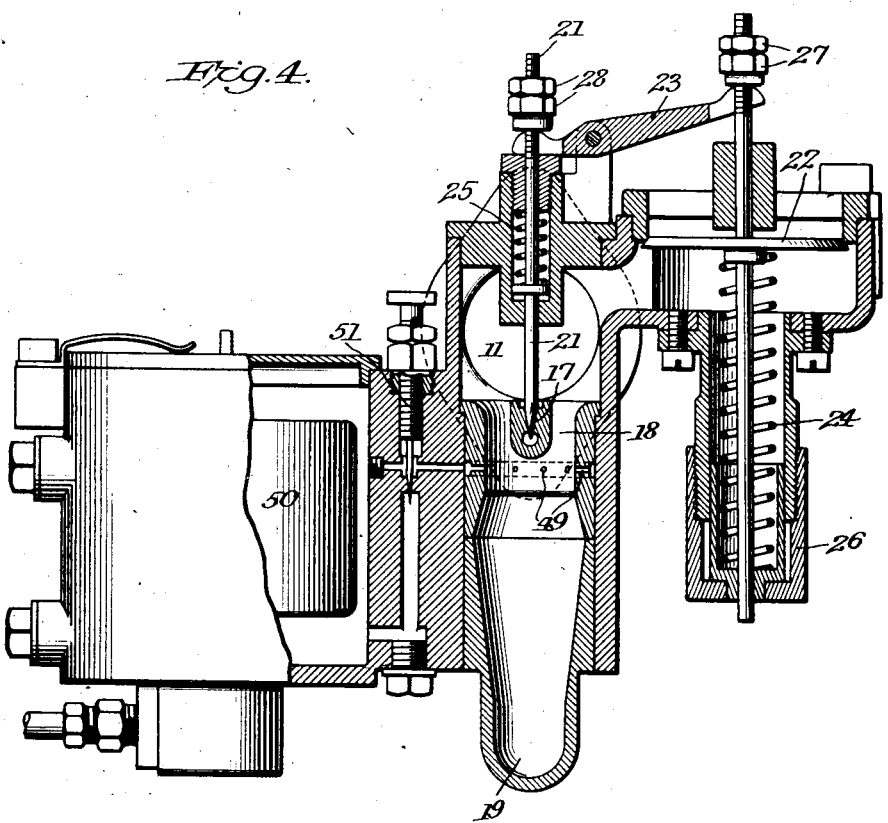

1,718,569

UNITED STATES PATENT OFFICE.

ROBERT F. LONABERGER AND CHARLES F. SANDS, OF READING, PENNSYLVANIA, ASSIGNORS TO LLOYD A. UNGER, TRUSTEE.

HEAVY-FUEL VAPORIZER FOR INTERNAL-COMBUSTION ENGINES.

Application filed February 13, 1926. Serial No. 88,065.

This invention aims to improve the operation of internal combustion engines of the type utilizing a mixture of air and a volatile liquid fuel, and more particularly to adapt such engines to operation with heavy liquid fuels not easily volatilized, such as kerosene, petroleum distillate and fuel oil for example.

The invention further aims to enable non-volatile fuels to be utilized in operating internal combustion engines primarily designed for running on gasoline, to simplify the construction of heavy fuel vaporizers, and to adapt one and the same vaporizer for producing a suitable explosive mixture from either light or heavy fuels.

Further aims and advantages of the invention appear in connection with the following description of the illustrative embodiment shown in the accompanying drawings, wherein Fig. 1 is a plan view of a vaporizer primarily intended for internal combustion engines of the self-propelled vehicle type, wherein self-starting means are usually provided, and is adapted to operate under all conditions of load and speed; and Figs. 2, 3 and 4 are vertical cross sections on the lines 2—2; 3—3 and 4—4, respectively, of Fig. 1, looking in the direction of the arrows in each case.

In the embodiment of the invention illustrated in the drawings, referring particularly to Figs. 1, 2 and 4, the vaporizer body has an outlet pipe 11 which is adapted to be secured to and supported by the inlet pipe or manifold of the internal combustion engine by any suitable means, such as the bolting flange 12. A throttle valve 13 may be fitted in the outlet pipe for controlling the flow of fuel mixture to the engine.

The vaporizer has two fuel nozzles for normal operation, a primary nozzle 14 (see Fig. 3) in the burner passage 15 for feeding liquid fuel into the air stream passing through said passage into the combustion chamber 16; and a high speed nozzle 17 (see Figs. 2 and 4) arranged in the throat 18 where the combustion flue 19 enters the outlet pipe 11 for feeding preheated heavy fuel into the mixture of air and gases from the combustion chamber.

The flow of fuel through the primary fuel nozzle may be adjusted by means of the screw stemmed needle valve 20 or other convenient means to suit the fuel and air conditions. The flow of preheated fuel from the high speed nozzle 17 may be controlled by means of a spring pressed needle valve 21, which is lifted from its seat in the mouth of the nozzle by the opening of the auxiliary air valve 22 through the intermediary of the lever 23 (see Fig. 4). The air valve spring 24 and high speed valve spring 25 normally maintain these valves closed, and provide means for varying the amount of suction necessary to operate them. An adjusting sleeve 26 for the auxiliary air valve spring, and adjusting nuts 27, 28, on the upwardly projecting stems of the air valve and high speed needle valve, respectively, provide means for adjusting the opening of these valves to suit the conditions of operation for maintaining the desired proportions of air and preheated fuel in the mixture passing from the vaporizer. A cranked clamp or locking screw 29 (see Fig. 1) controlled by means of a flexible wire or other suitable connection from a convenient point, is provided for securing the air valve and high speed needle valve in closed position for enabling a rich mixture to be produced, as for starting operation of the vaporizer.

The products of combustion and unburned or partly burned fuel pass from the combustion chamber 16 through a zig-zag annular passage 30 (see Fig. 2) into the combustion flue 19, where they are diluted with air from the auxiliary air inlet 31, and the flame extinguished if it has not been extinguished in the narrow passage 30. A spring pressed valve 32 controls the opening from the atmosphere into the auxiliary air inlet. The minimum opening and maximum opening of this valve may be adjusted by means of the screw 33 and pin 34 to suit the starting or idling and the normal running conditions, respectively, the valve spring 35 being strong enough to hold the valve in its nearly closed position during starting or idling of the motor, but not strong enough to hold it against the suction developed in the auxiliary air inlet during normal running with the throttle valve partly or fully open.

It is desirable to close the auxiliary air inlet openings 31 entirely upon starting and for this purpose we provide a rotatable closure plate 31ª having perforations adapted to be brought into registry with the openings 31 when it is desired to open the air valve. Suitable control means from a convenient point may be provided to manipulate this closure valve.

For starting when cold, the vaporizer is fitted with a gasoline spray nozzle 36 (see Figs. 1 and 3) in the burner passage 15, and fed from any convenient supply of gasoline. A gasoline valve 37 is provided, controlled by a flexible wire or other suitable means, operated from a convenient point. The suction at starting is sufficient to draw the gasoline from the tank or supply provided it is not too far below the orifice of the nozzle, the exact level of the liquid with reference to the orifice being unimportant.

We prefer to use gasoline exclusively for starting; consequently a heavy fuel cut-off valve 37$^a$ is provided (see Fig. 3) for closing the orifice of the nozzle 14. This valve may be and preferably is similar to the gasoline control valve and may be operated by the same control means if desired.

Preferably the burner inlet passage discharges into the combustion chamber through a circular series of burner orifices 38 surrounding the auxiliary air inlet, and thereby causing a circular flame in the combustion chamber which is deflected against its sloping side walls by the hood 39 surrounding the annular flame extinguishing passage 30. The proportions of the air inlet orifice 40 (see Fig. 1) and fuel spray nozzle orifices 14 are such as to form a rich gas in the burner mixing passage that normally burns with a smokeless blue flame in the combustion chamber. A spark plug 41 is provided for igniting the fuel mixture as it enters the combustion chamber from the burner orifices.

Surrounding the combustion chamber is a liquid fuel preheating chamber 42 (see Fig. 2) which is fed from the same fuel supply as the primary nozzle 14. The preheated fuel outlet passage 43 rises from the fuel preheating chamber and supplies the high speed fuel nozzle 17 through a hollow restricting plug 44 which has small lateral openings 45 which communicate with an annular chamber 46 to discharge preheated fuel into the small duct 47 leading to the high speed nozzle 17. The extension of the passage 43 above the restricting plug provides a space into which the fuel may back up upon cutting off the high speed nozzle more or less suddenly. This extension has a by-pass around the restricting plug 44.

In order that gasoline may be substituted for heavier liquid fuel in case of emergency without requiring readjustment of the primary nozzle 14 and high speed nozzle 17, an annular series of fuel orifices 49 is provided in the throat below the high speed nozzle, and connected with the fuel chamber 50 through a duct controlled by a needle valve 51 (see Fig. 4). This needle valve is closed when the vaporizer is operating upon heavy liquid fuel in the fuel chamber 50.

The operation of the vaporizer is almost entirely automatic except for starting, being controlled by the throttle valve as in gasoline carburetors. For starting, the auxiliary air valve 22 is locked in its closed position, and the gasoline cock 37 is opened before turning over the engine, while the heavy fuel shut-off valve 37$^a$ is closed. The engine suction starts as soon as the engine is turned over, and causes a considerable drop in pressure and flow of air through the burner inlet passage 15, picking up gasoline. The spark plug is preferably connected in the engine ignition circuit, and commences sparking when the engine is started rotating. The mixture of gasoline and air explodes in the combustion chamber and burns with a yellowish flame until the apparatus warms up, at which time the gasoline may be shut off, the auxiliary air valve unlocked, and the heavy fuel cut-off valve opened. A small opening 52 (see Fig. 1) is provided in the top wall of the combustion chamber for observing the condition of the flame.

During normal running of the motor the engine suction will cause the auxiliary air valve 22 to remain partly open, and thus the needle valve 21 for the high speed fuel valve 17 will be slightly raised, permitting some preheated fuel to pass into the stream of air and gases from the combustion chamber passing through the throat 18 and mix therewith. As the engine speed increases with a wider opening of the throttle valve 13, the suction in the passage 11 will increase and open up the auxiliary air valve 22 and high speed fuel valve 21, and pull the heated liquid fuel from the nozzle 17 through the port 45 in the restricting plug 44, thereby increasing the amount of fuel fed to the engine and counteracting the tendency of the auxiliary air valve to make the mixture too lean with a wide open throttle setting at high speeds.

Our invention is compact, free from a large number of parts requiring frequent adjustment or manipulation, and gives a vaporized mixture of heavy fuel and air that will burn in the engine without producing an objectionable amount of smoke and without preignition or knocking.

Obviously our invention is capable of various changes.

What we claim and desire to secure by Letters Patent is:

1. A heavy fuel vaporizer for internal combustion engines comprising, in combination, a combustion burner and chamber, means to supply a rich combustible fluid mixture to said burner, a fuel mixing chamber connected to receive hot products of combustion from the combustion chamber, a supplemental fuel nozzle arranged to discharge heavy fuel into mixing relation with the products of combustion from said burner, a supplemental air valve arranged to supply air to the mixing chamber, and a preheating chamber for the fuel supplied to the supplemental fuel nozzle encircling the combustion chamber and arranged to absorb heat from the combustion burner.

2. A heavy fuel vaporizer for internal combustion engines comprising, in combination, a combustion burner connected to the intake passage of the engine and arranged to discharge products of combustion therein, a restricted air inlet passage for the combustion burner chamber, a light fuel nozzle and a heavy fuel nozzle arranged to discharge into the air passage, valves to control each of said nozzles connected for remote control, means to extinguish the flame in the combustion burner before the fuel is completely consumed, and high speed fuel and air valves connected to operate simultaneously in response to engine suction and discharging into the engine intake passage to mix with the products of combustion from the burner.

3. In a heavy fuel vaporizer for internal combustion engines, a combustion burner and chamber connected to discharge products of combustion into the intake passage of the engine, means initially to supply a readily combustible rich mixture to the chamber, means to supply heavy fuel to the burner after it is initially heated, a heavy fuel nozzle in the engine intake passage a fuel preheating chamber connected to supply said heavy fuel nozzle and surrounding a portion of said combustion chamber to absorb heat therefrom, and automatically operating means to supply auxiliary air to the engine intake passage thereby to provide a normal fuel mixture under all running conditions.

4. A heavy fuel vaporizer for internal combustion engines comprising, in combination, a combustion burner chamber, means for supplying a combustible mixture of fuel and air to said chamber, an electric igniter for said mixture, a main mixing chamber in the engine intake passage, a conduit connecting the burner to discharge hot products therefrom into said mixing chamber, a heavy fuel preheating chamber associated with said combustion chamber and connected to discharge into said mixing chamber, a manually controlled main air valve to admit air to said conduit and an automatic air valve connected to supply auxiliary air to said main mixing chamber when the preheated heavy fuel is discharged therein.

5. A heavy fuel vaporizer comprising a main air supply passage having an automatic valve for controlling the flow of air in response to engine suction, manual means for closing said main air supply at starting, a combustion burner chamber surrounding said main air supply passage and discharging into it, means independent of said main air supply for admitting a supply of fuel and air to said combustion burner chamber, a fuel heating chamber surrounding said combustion burner chamber, a fuel nozzle in said main air supply passage beyond the discharge from said combustion burner chamber, a duct supplying said fuel nozzle from said fuel heating chamber, a valve in said duct, an automatic auxiliary air valve, and means connecting said auxiliary air valve and fuel supply valve whereby they operate conjointly.

6. A heavy fuel vaporizer having a combustion burner and a fuel heating chamber surrounding it in combination with a fuel nozzle located in the outflow passage from said burner, calibrated means for controlling the flow of heated fuel from said fuel nozzle, and valve means for admitting additional air to said outflow passage for producing a normal fuel mixture with said heated fuel.

7. A heavy fuel vaporizer having a combustion burner and a fuel heating chamber surrounding it, an air passage extending through the burner and discharging into its outflow passage, in combination with a fuel nozzle located in the outflow passage from said burner, calibrated means for controlling the flow of heated fuel from said fuel nozzle, and valve means for admitting air to said outflow passage for producing a normal fuel mixture with said heated fuel.

8. In a heavy fuel vaporizer for internal combustion engines, a combustion burner and chamber connected to discharge products of combustion into the intake passage of the engine, means initially to supply a readily volatilizable fuel to the burner, means to cut off the supply of said fuel and supply heavy fuel to the burner after it is initially heated, a heavy fuel nozzle in the engine intake passage, a fuel preheating chamber connected to supply said heavy fuel nozzle and surrounding a portion of said combustion chamber to absorb heat therefrom and means to supply auxiliary air to the engine intake passage thereby to provide a normal fuel mixture under all running conditions.

In testimony whereof, we have signed our names to this specification.

ROBERT F. LONABERGER.
CHARLES F. SANDS.